(12) United States Patent
Meier et al.

(10) Patent No.: US 7,750,901 B2
(45) Date of Patent: *Jul. 6, 2010

(54) TELESTRATOR SYSTEM

(75) Inventors: Kevin R Meier, Redwood City, CA (US); Walter Hsiao, Mountain View, CA (US); James R Gloudemans, San Mateo, CA (US); Marvin S White, San Carlos, CA (US); Richard H Cavallaro, Mountain View, CA (US); Stanley K Honey, Palo Alto, CA (US)

(73) Assignee: Sportvision, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/359,092

(22) Filed: Jan. 23, 2009

(65) Prior Publication Data

US 2009/0128580 A1 May 21, 2009

Related U.S. Application Data

(63) Continuation of application No. 11/297,036, filed on Dec. 8, 2005, now Pat. No. 7,492,363, which is a continuation of application No. 09/425,992, filed on Oct. 21, 1999, now Pat. No. 7,075,556.

(51) Int. Cl.
*G06T 15/00* (2006.01)
(52) U.S. Cl. ............... 345/418; 345/629; 345/632; 345/634
(58) Field of Classification Search ........ 345/418, 345/629, 630, 631, 632, 633, 634
See application file for complete search history.

(56) References Cited

U.S. PATENT DOCUMENTS 3,580,993 A 5/1971 Sandorf et al.

(Continued)

FOREIGN PATENT DOCUMENTS

DE 41 01 156 A1 1/1991

(Continued)

OTHER PUBLICATIONS

Chyron CODI Sketchpad—Guide to Operations, by Chyron Graphics, Pub. No. 2A11631, 1993.

(Continued)

*Primary Examiner*—Phu Nguyen
(74) *Attorney, Agent, or Firm*—Vierra Magen Marcus & DeNiro LLP

(57) ABSTRACT

A telestrator system is disclosed that allows a broadcaster to annotate video during or after an event. For example, while televising a sporting event, an announcer (or other user) can use the present invention to draw over the video of the event to highlight one or more actions, features, etc. In one embodiment, when the announcer draws over the video, it appears that the announcer is drawing on the field or location of the event. Such an appearance can be performed by mapping the pixels location from the user's drawing to three dimensional locations at the event. Other embodiments include drawing on the video without obscuring persons and/or other specified objects, and/or smoothing the drawings in real time.

10 Claims, 8 Drawing Sheets

U.S. PATENT DOCUMENTS

| | | |
|---|---|---|
| 3,595,987 A | 7/1971 | Vlahos |
| 3,617,630 A | 11/1971 | Reiffel |
| 3,840,699 A | 10/1974 | Bowerman |
| 3,973,239 A | 8/1976 | Kakumoto et al. |
| 4,064,528 A | 12/1977 | Bowerman |
| 4,067,015 A | 1/1978 | Mogayero et al. |
| 4,084,184 A | 4/1978 | Crain |
| 4,100,569 A | 7/1978 | Vlahos |
| 4,179,704 A | 12/1979 | Moore et al. |
| 4,319,266 A | 3/1982 | Bannister |
| 4,344,085 A | 8/1982 | Vlahos |
| 4,386,363 A | 5/1983 | Morrison |
| 4,409,611 A | 10/1983 | Vlahos |
| 4,413,273 A | 11/1983 | Wischermann |
| 4,420,770 A | 12/1983 | Rahman |
| 4,521,196 A | 6/1985 | Briard et al. |
| 4,589,013 A | 5/1986 | Vlahos et al. |
| 4,591,897 A | 5/1986 | Edelson |
| 4,612,666 A | 9/1986 | King |
| 4,625,231 A | 11/1986 | Vlahos |
| 4,667,221 A | 5/1987 | Cawley et al. |
| 4,674,125 A | 6/1987 | Carlson et al. |
| 4,700,306 A | 10/1987 | Wallmander |
| 4,811,084 A | 3/1989 | Belmares-Sarabia et al. |
| 4,817,171 A | 3/1989 | Stentiford |
| 4,924,507 A | 5/1990 | Chao et al. |
| 4,950,050 A | 8/1990 | Pernick et al. |
| 4,970,666 A | 11/1990 | Welsh et al. |
| 4,975,770 A | 12/1990 | Troxell |
| 4,999,709 A | 3/1991 | Yamazaki et al. |
| 5,063,603 A | 11/1991 | Burt |
| 5,150,895 A | 9/1992 | Berger |
| 5,179,421 A | 1/1993 | Parker et al. |
| 5,184,820 A | 2/1993 | Keating et al. |
| 5,207,720 A | 5/1993 | Sheperd |
| 5,249,039 A | 9/1993 | Chaplin |
| 5,264,933 A | 11/1993 | Rosser et al. |
| 5,305,107 A | 4/1994 | Gale et al. |
| 5,313,304 A | 5/1994 | Chaplin |
| 5,343,252 A | 8/1994 | Dadourian |
| 5,353,392 A | 10/1994 | Luquet et al. |
| 5,384,912 A | 1/1995 | Ogrinc et al. |
| 5,398,075 A | 3/1995 | Freytag et al. |
| 5,436,672 A | 7/1995 | Medioni et al. |
| 5,459,529 A | 10/1995 | Searby et al. |
| 5,459,793 A | 10/1995 | Naoi et al. |
| 5,465,308 A | 11/1995 | Hutcheson et al. |
| 5,469,536 A | 11/1995 | Blank |
| 5,488,675 A | 1/1996 | Hanna |
| 5,491,517 A | 2/1996 | Kreitman et al. |
| 5,500,684 A | 3/1996 | Uya |
| 5,543,856 A | 8/1996 | Rosser et al. |
| 5,564,698 A | 10/1996 | Honey et al. |
| 5,566,251 A | 10/1996 | Hanna et al. |
| 5,592,236 A | 1/1997 | Rosenbaum et al. |
| 5,610,653 A | 3/1997 | Abecassis |
| 5,627,915 A | 5/1997 | Rosser et al. |
| 5,668,629 A | 9/1997 | Parker et al. |
| 5,745,126 A | 4/1998 | Jain et al. |
| 5,808,695 A | 9/1998 | Rosser et al. |
| 5,850,352 A | 12/1998 | Moezzi et al. |
| 5,862,517 A | 1/1999 | Honey et al. |
| 5,892,554 A | 4/1999 | DiCicco et al. |
| 5,907,315 A | 5/1999 | Vlahos et al. |
| 5,912,700 A | 6/1999 | Honey et al. |
| 5,917,553 A | 6/1999 | Honey et al. |
| 5,953,076 A | 9/1999 | Astle et al. |
| 5,977,960 A | 11/1999 | Nally et al. |
| 6,014,472 A | 1/2000 | Minami et al. |
| 6,057,833 A | 5/2000 | Heidmann et al. |
| 6,100,925 A | 8/2000 | Rosser et al. |
| 6,133,946 A | 10/2000 | Cavallaro et al. |
| 6,134,346 A | 10/2000 | Berman et al. |
| 6,167,356 A | 12/2000 | Squadron et al. |
| 6,229,550 B1 | 5/2001 | Gloudemans et al. |
| 6,266,100 B1 | 7/2001 | Gloudemans et al. |
| 6,292,130 B1 | 9/2001 | Cavallaro et al. |
| 6,292,227 B1 | 9/2001 | Wilf et al. |
| 6,304,665 B1 | 10/2001 | Cavallaro et al. |
| 6,308,327 B1 | 10/2001 | Liu et al. |
| 6,357,042 B2 | 3/2002 | Srinivasan et al. |
| 6,466,275 B1 | 10/2002 | Honey et al. |
| 6,496,196 B2 | 12/2002 | Shiga |
| 7,075,556 B1 * | 7/2006 | Meier et al. .................. 345/629 |
| 7,492,363 B2 * | 2/2009 | Meier et al. .................. 345/419 |
| 2006/0087504 A1 | 4/2006 | Meier et al. |

FOREIGN PATENT DOCUMENTS

| | | |
|---|---|---|
| SU | 1659078 A1 | 6/1991 |
| WO | WO 95/10915 | 4/1995 |
| WO | WO 95/10919 | 4/1995 |
| WO | WO 97/41683 | 11/1997 |
| WO | WO 98/24242 | 6/1998 |
| WO | WO 98/24243 | 6/1998 |
| WO | WO 98/28906 | 7/1998 |
| WO | WO 99/38320 | 7/1999 |
| WO | WO 00/14959 | 3/2000 |

OTHER PUBLICATIONS

Replay 2000—The Ultimate Workstation for Sport Commentators and Producers, Orad Hi-Tec Systems, Apr. 1995.

SailTrack, GPS Tracking System for Animated Graphics Broadcast Coverage of the America's Cup Races, 1992.

SailTrack Technical Overview, 1992.

Sail Viz Software Documentation, 1992.

Adobe Photoshop 4.0 User Guide, 1996, Table of Contents, pp. iii-vii, pp. 107-140, 143-169, 173-196, 245-275, 279-301, Appendix B, pp. 371-375, Adobe Systems Incorporated, San Jose, CA, USA, 1995.

Siprut, Mark, Adobe Photoshop Handbook, Photoshop 3 Edition, 1995, pp. 103-144, 145-208, 209-266, 301-358, 359-430, 431-474 & 515-542, Random House, Inc., New York, NY, USA (simultaneously published by Random House of Canada, Limited, Canada).

Tsang, et al., "Boom Chameleon: Simultaneous Capture of 3D viewpoint, voice and gesture annotations on a spatially-aware display," UIST, Oct. 2002, pp. 111-120.

Rees, et al., "Click-It: Interactive Television Highlighter for Sports Action Replay," Proceeding of Pattern Recognition, Aug. 1998, pp. 1-4.

* cited by examiner

TELESTRATOR SYSTEM

CLAIM OF PRIORITY

This application is a continuation application of U.S. patent application Ser. No. 11/297,036, now U.S. Pat. No. 7,492,363, entitled "TELESTRATOR SYSTEM," filed Dec. 8, 2005, which is a continuation of U.S. patent application Ser. No. 09/425,992, now U.S. Pat. No. 7,075,556, entitled "TELESTRATOR SYSTEM," filed Oct. 21, 1999, both of which are incorporated herein by reference in their entirety.

CROSS-REFERENCE TO RELATED APPLICATIONS

This Application is related to the following Applications:
SYSTEM FOR ENHANCING A VIDEO PRESENTATION OF A LIVE EVENT, by Gloudemans, et al., Ser. No. 09/160,534, filed Sep. 24, 1998, now U.S. Pat. No. 6,266,100;
DETECTING A TALLIED CAMERA, by Marvin S. White, et al., Ser. No. 09/160,532, filed Sep. 24, 1998, now abandoned; and
BLENDING A GRAPHIC, by James R. Gloudemans, et al., Ser. No. 09/160,428, filed Sep. 24, 1998, now U.S. Pat. No. 6,229,550.

Each of these related Applications are incorporated herein by reference.

BACKGROUND OF THE INVENTION

1. Field of the Invention

The present invention is directed to a system for annotating video or still images.

2. Description of the Related Art

The remarkable, often astonishing, physical skills and feats of great athletes draw millions of people every day to follow sports. In particular, the amount of people watching sports on television and the amount of advertising revenue received for televised sports has increased significantly. To satisfy the increased demand for televised sports, broadcasters have deployed a varied repertoire of technologies to highlight to viewers these exciting events. For example, broadcasters have started adding graphical enhancements to the video of the sporting events. Examples of graphic enhancements have included highlighting moving objects, highlighting portions of a playing field (e.g. first down line), adding virtual advertisements and adding of other graphics to the video of the event.

One enhancement that has been particularly popular has been the telestrator system, which is a system that allows an operator to draw on live or stored video. Examples of drawing on the live or stored video include the operator drawing lines, circles or other shapes, or symbols. While the operator draws the lines, the operator will discuss events, objects or people significant to the drawing. One example of a successful use of telestrator systems is during the broadcast of American football games. An announcer may draw on an image to show a player out of position, a loose ball, a player offsides, etc. Various telestrator systems allow the broadcaster to control the width, color, texture and shadowing of any drawing. Additionally, some systems allow for the inclusion of automatic shapes and animated icons with the video.

Prior art telestrator systems typically include a video monitor with a touch screen or digitizing table. In communication with both the touch screen and the monitor is a processor. The processor receives input from the touch screen and is responsible for adding to the video whatever is drawn by the user.

While the prior art telestrator systems have been successful, they can be improved to further enhance viewer enjoyment of the event. For example, the prior art telestrator systems only work well when drawing on still images from a video. If the video images move, the camera moves or the broadcaster switches to a different camera after the operator draws on the video, then the drawing from the operator has to be removed from the video or the drawing will be out of place. This is because the drawing is added to the video by overlaying it on top of the current frame being broadcast. Even if the images or the camera move, the position of the drawing in the frame will not move and will remain in the same position in subsequent frames of video. For example, FIG. 1 depicts a frame of video 10. Frame 10 shows a portion of an American football field including the 15 yard line and the 20 yard line. In this example, the operator of the prior art telestrator system has drawn an arrow 12 to indicate where a player was running, direction of movement, etc. If the camera providing the video were to pan so that the camera points to a different portion of the football field, the portion of the football field in the video would change but the position of arrow 12 in the frame would not. For example, FIG. 2 shows a second frame 14 from the prior art telestrator system. Frame 14 differs from frame 10 because the camera has panned to show the 25 yard line. Although the location of the portions of the field have moved between frame 10 and frame 14, the position of arrow 12 remains in the exact same position in frames 10 and 14. If the operator originally was drawing arrow 12 to show the path a player ran on the field, when frame 14 is depicted arrow 12 will no longer show the actual path. That is, in frame 10 arrow 12 shows a path across the 15 yard line stopping just before the 20 yard line. On the other hand, in frame 14 arrow 12 shows a path not crossing the 15 yard line, but rather crossing the 20 yard line. Thus, arrow 12 is no longer an accurate representation of what the operator intended to draw.

A further enhancement that could be made to prior art telestrator systems is to improve the quality of the illustration. For example, an operator may have sloppy penmanship and, thus, the lines or shapes drawn could appear too sloppy or not pleasing to the viewer. Alternatively, when prior art telestrator operators draw over video, whatever they draw tends to be placed on top of and obscuring the players or objects. Therefore, there is a need to improve the prior art telestrator systems.

SUMMARY OF THE INVENTION

The present invention, roughly described, is directed to an improved telestrator system that allows a broadcaster or other operator to annotate video during or after an event. For example, while televising a sporting event (or other type of event), an announcer (or other user) can use the present invention to draw over the video of the event to highlight one or more actions, features, etc. In one embodiment, when the user draws over the video it appears that the user is drawing on the actual field or location of the event. Other embodiments of the present invention include technology for smoothing out whatever the user draws to make it look more pleasing to the eye. In yet another embodiment, the present invention includes drawing in a manner that does not obscure or hide persons or objects.

In one embodiment, the system receives points drawn by a user. These points are used to create a smooth curve and the curve is transformed to three dimensional locations on the field or surface. These three dimensional locations are then transformed back to two dimensional positions in future video frames so that whatever is drawn will appear to be drawn on the field even if the camera moves or a different camera is used.

In one embodiment, the system includes a touch screen and a display in communication with one or more processors. The processor(s) receive data representing the user's drawing from the touch screen, smooth the data, transform the data to three dimensional locations, transform the data back to two dimensional locations for future frames or fields, and blend the user's drawing with the video. The blending can be performed with a video processor, a keyer or another video modification device.

In order to transform the drawings between two dimensional and three dimensional coordinates, the processor(s) use data from camera sensors. These camera sensors are connected to or in communication with various video cameras at the event. Suitable camera sensors include optical shaft encoders, inclinometers and fibre optic gyros, as well as monitoring electrical outputs of the camera lens (2× Extender, focus, zoom). Data from the camera sensors is used to determine the camera viewpoint (position in space, orientation and field of view). This data can be used to create transformation matrices to transform positions between three dimensional real space and two dimensional video coordinate systems.

The present invention is accomplished using a combination of both hardware and software. The software used for the present invention is stored on one or more processor readable storage media including hard disk drives, CD-ROMs, optical disks, floppy disks, RAM, ROM or other suitable storage devices. In alternative embodiments, some or all of the software can be replaced by dedicated hardware including custom integrated circuits, gate arrays, FPGAs, PLDs, and special purpose computers. Additionally, much of the hardware discussed below can be replaced by additional software on general purpose or special video computers.

These and other objects and advantages of the present invention will appear more clearly from the following description in which the preferred embodiment of the invention has been set forth in conjunction with the drawings.

DETAILED DESCRIPTION

The present invention can be used to enhance a video representation of an event. For purposes of explanation only, the example discussed in this present application is the broadcast of an American football game. However, the present invention applies equally to other sporting events and other non-sporting events. Additionally, the present invention can be used to enhance live video, stored video or still images. One exemplar enhancement is the blending of one or more graphics with the video. A graphic includes drawings or illustrations, highlights, logos, shapes, etc. Examples of drawings include curves, shapes, text and anything that can be drawn by hand or otherwise. A curve includes curved lines and straight lines. Video means the analog or digital signal depicting (or used to produce) moving images. Blending means combining at least a first image or video with at least a second image of video such that the result includes all or part of that first image or video and all or part of the second image or video. One example of how images are blended includes using a keyer to key one video or image over another video or image.

Figure 3:
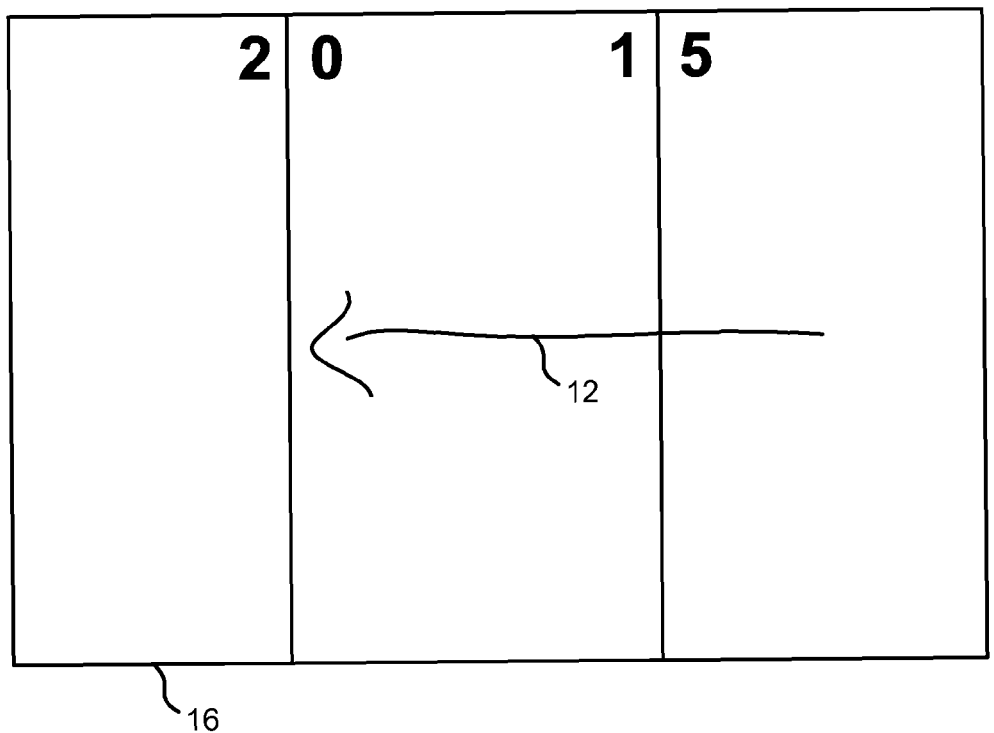
FIGS. 3 and 4 depict video frames that result from use of the present invention telestrator system.
Figure 4:
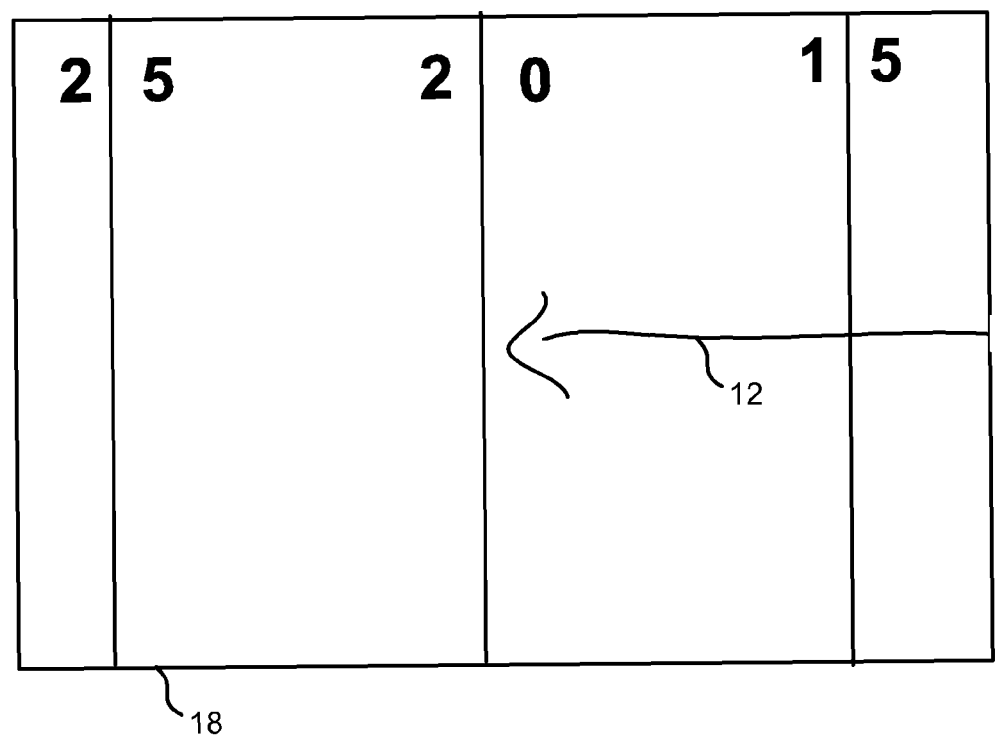

One embodiment of the present invention telestrator system allows a user of the system to draw on the video such that the drawing appears to be drawn directly on the surface of the scene being depicted in the video. For example, during an American football game, if a user draws on the video it appears that the user is actually drawing on the playing field. After the user draws the illustration, the drawing will appear to be painted on the playing field so that if the camera moves or the broadcaster changes cameras the drawing still appears on the playing field in the appropriate perspective. This feature is depicted in FIGS. 3 and 4. FIG. 3 shows a video frame 16 which is broadcast as a result of using the present invention. The operator had drawn an arrow 12 to show the path of a player or object on the playing field. FIG. 4 shows a video frame 18 which is also the result of using the present invention. However, FIG. 4 shows arrow 12 at a different position in frame 18 than in frame 16. That is because after the user had drawn arrow 12 and it was depicted in frame 16, the camera panned down the playing field. Instead of being pointed between the 20 and 15 yard lines, the camera is now pointed directly at the 20 yard line and, thus, the 25 yard line is now visible. Because the field moved within the camera's field of view, the location of arrow 12 also moved within the camera's field of view. Arrow 12 now appears to be drawn directly on the playing field as opposed to on the television monitor. As the field moves on the video screen, arrow 12 will also move. In some embodiments, the blending of the graphics from the user of the telestrator system must take into account occlusions. That is, if a player steps on top of the area where the graphic is, the graphic should not be drawn over the player. The player should appear to be stepping or standing in front of the graphic. Similarly, there may be portions of the surface or field which should not be drawn over by the user's graphic. For example, the broadcaster may decide that the announcer's drawing should not appear to obscure any objects (such as a football) or markings on the field (e.g. the numbers painted on the field).

Figure 5:
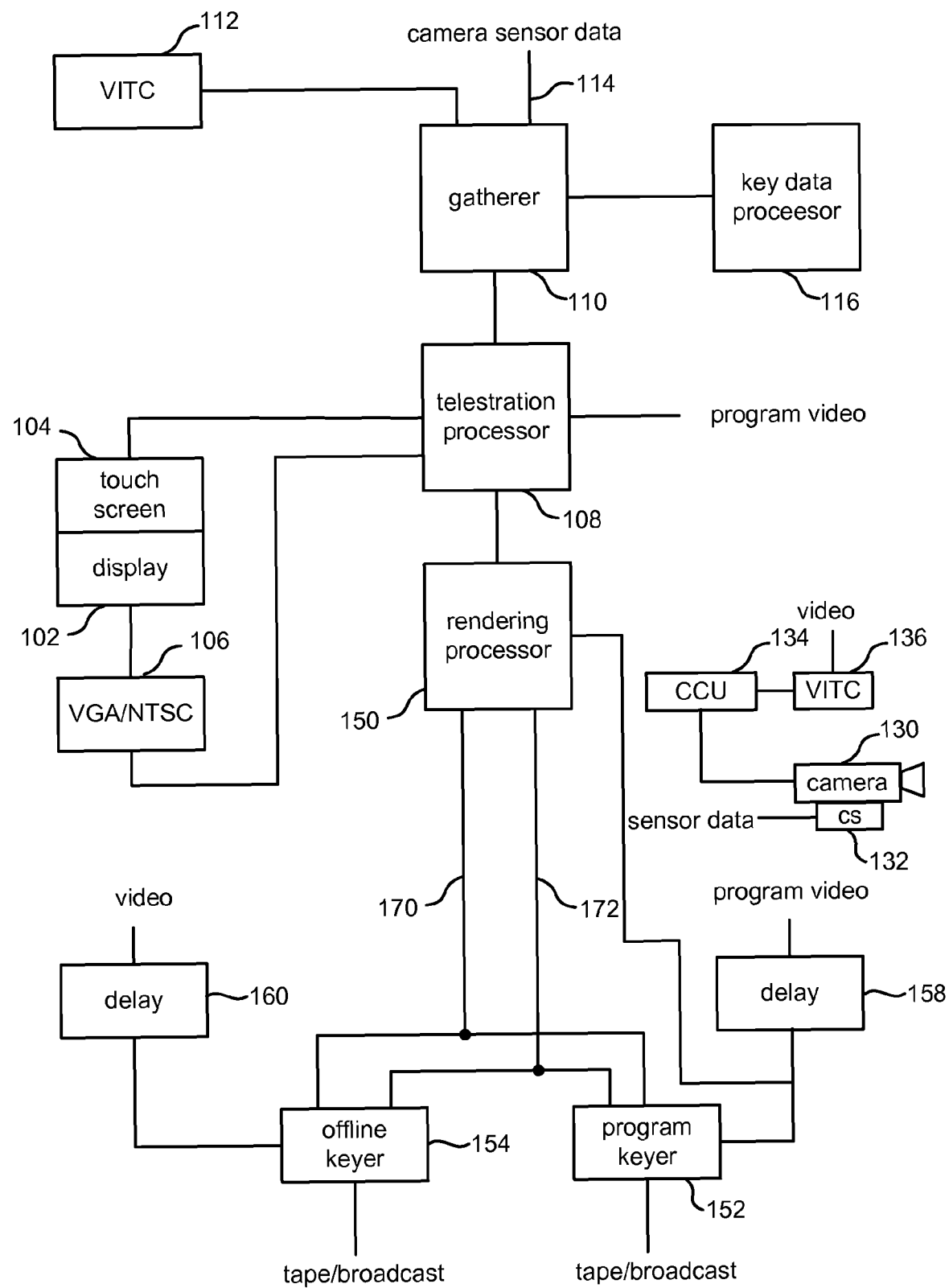
FIG. 5 is a block diagram of one exemplar set of hardware used to implement the present invention.

FIG. 5 is a block diagram of the hardware components that comprise one embodiment of the present invention. The user interface for the operator of the present invention includes a display 102 and touch screen 104 mounted on display 102. In one embodiment, the display is a flat panel display and the touch screen is manufactured from Elo TouchSystems, Inc. (www.elotouch.com). The output of touch screen 104 is sent to telestration processor 108. In one embodiment, telestration processor 108 sends a video signal to video format converter 106. The output of video format converter 106 is communicated to display 102. In one embodiment, video format converter 106 converts the video signal of telestration processor 108 from VGA format to NTSC format. In other embodiments, there may not be a need for converter 106. In operation, a user of the system can use a finger on touch screen 104 to draw a graphic (e.g. shape or curve). Information about what is being drawn is sent to telestration processor 108. The resulting blend of the graphic with the video is sent back to display 102. In another embodiment, display 102 would receive the actual broadcast.

Telestration processor 108 also receives the program video. At a given event, a broadcaster typically uses multiple cameras. The producer or director of the event will typically choose one camera for broadcast. The program video is the video from the camera chosen for broadcast. Telestration processor 108 may also receive video from other sources (e.g. replay decks, other cameras, etc.) for offline work. Telestration processor 108 also receives data from gatherer 110. In one embodiment, gatherer 110 is a computer. In another embodiment, gatherer 110 can be dedicated hardware. Gatherer 110 receives time code from VITC (Vertical Interval Time Code) 112, camera sensor data from the various instrumented cameras (line 114), and key data from a key data processor 116.

Each of the cameras used with the present invention includes a number of camera sensors that measure data (camera sensor data) to determine the field of view of the camera. FIG. 5 shows an example of camera 130 with camera sensors 132. The camera sensors could include any or all of the following: optical shaft encoders, fibre optic gyros, inclinometers, and reading voltages from the lens (e.g. 2× Extender, focus, zoom). Other camera sensors can also be used. Data from camera sensors 132 is sent to gatherer 110. In one embodiment, the camera sensor data for a given camera is transmitted to a production studio from the camera location via the camera's audio channel. The production studio includes hardware to demodulate the audio channel and send the camera sensor data to gatherer 110. In some instances, the production studio is in a truck at the event.

Figure 1:
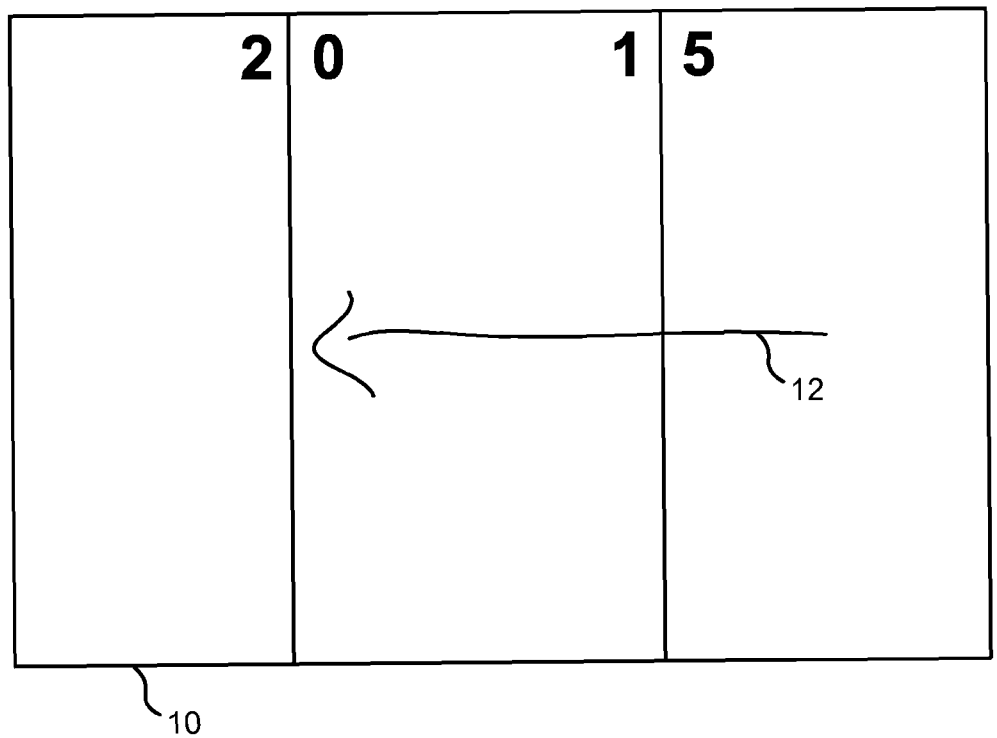
FIGS. 1 and 2 show video frames that result from the use of prior art telestrator systems.
Figure 2:
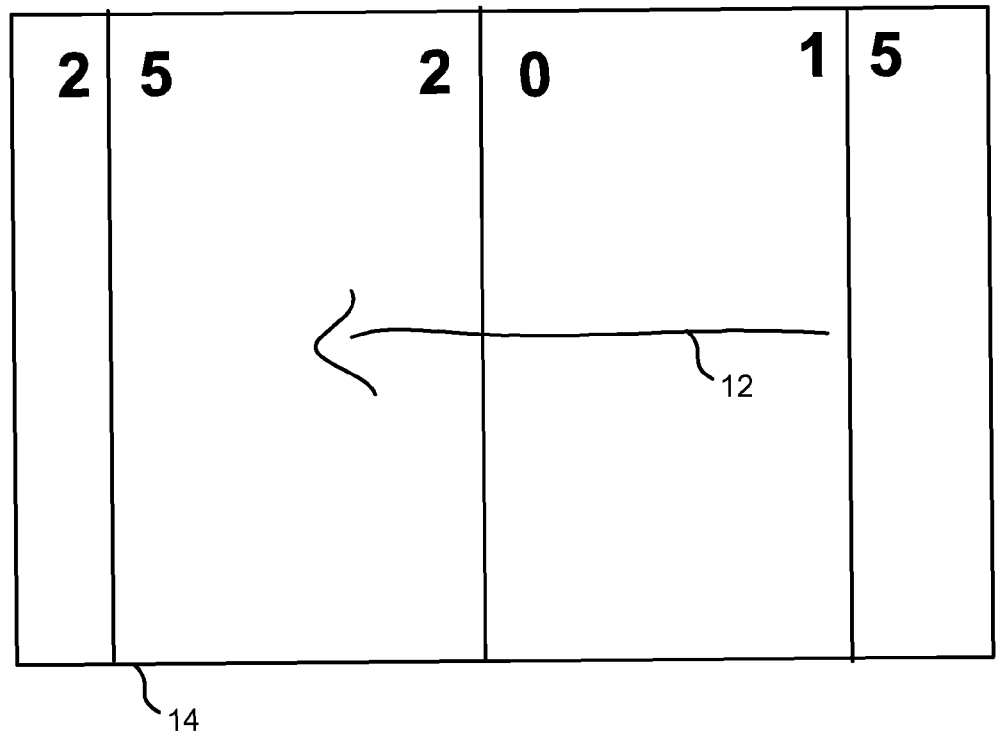

The video from camera 130 is sent to camera control unit 134, which controls various video and optical parameters for camera 130. The output of camera control unit 134 is sent to VITC inserter 136 which adds a time code and unique camera identifier into the vertical blanking interval of the video from camera 130. The present invention can be operated using one or more instrumented cameras. In one embodiment, the present invention is operated with six cameras instrumented as shown in FIG. 1. Each camera would have its own CCU and its own VITC inserter. Each camera's VITC inserter is synchronized with VITC 112. In alternative embodiments, the present invention can be used with fixed, non-instrumented cameras. In another alternative, the present invention can be used with non-instrumented cameras that are not fixed, in combination with image recognition.

Broadcast cameras used according to the present invention are typically part of a camera assembly that includes a tripod base, a camera head interface (also called a tripod head interface) mounted on the tripod base, a camera head (also called a tripod head) mounted on the camera head interface, a camera mounted on the camera head, and a lens mounted on the camera. The tripod base is the standard tripod known in the art. The camera head can be a standard camera head known in the art, for example, a Vector 70 from Vinten, Inc. The Vector 70 allows the camera to tilt and pan. To measure tilt and pan, optical shaft encoders can be attached at the pan axis and tilt axis to measure the rotation of the camera about the pan axis and tilt axis. An example of an optical shaft encoder is the CP-850 Series from Computer Optical Products, 9305 Eton Avenue, Chatsworth, Calif. 91311. The pan shaft encoder is mounted in the camera head interface.

One or more inclinometers can be mounted on the camera head interface to measure attitude of the stationary portion of the camera assembly. Thus, if the camera assembly is on an angle, is kicked, or otherwise changes, that change in attitude will be detected. One example of a suitable inclinometer uses liquid between a pair of plates, and measures change of capacitance. Another example is an electrolyte varying the conductance between two conductors. In one embodiment, a suitable inclinometer indicates an absolute angle. In one alternative, the inclinometer can indicate angles up to ±1°, ±1.5° or ±6°. Other suitable ranges can also be used. An example of a suitable inclinometer is the Ceramic Tilt Sensor SH50054 from Spectron, 595 Old Willets Path, Hauppaug, N.Y. 11788, (516) 582-5600. Other suitable inclinometers can also be used with the present invention. In one embodiment, the system will include two inclinometers. A first inclinometer would be mounted on a first surface of the camera head interface. A second inclinometer would be mounted on a second surface of the camera head interface. The first surface is ideally orthogonal to the second surface. Both inclinometers would be connected to an electronics board for receiving the data and packaging it with the other sensors. The electronics board is part of the camera head interface.

One or more gyros can be mounted on the camera lens to measure high frequency vibrations and mechanical compliance between the moving portion of the camera assembly and the stationary portion of the camera assembly. In one embodiment, the system includes two gyros mounted on a block. The block itself is mounted on the lens of the camera. The first gyro is mounted on a first surface of the block and the second gyro is mounted on the second surface of the block. The first surface is ideally orthogonal to the second surface. In an alternative embodiment, the two gyros can be mounted on the tripod or the camera head interface. While the encoders discussed above measure angles relative to a fixed base, the gyro measures absolute angular rate information that is not relative to any part of the camera assembly. In one embodiment, the gyros are fibre optic gyros. An example of a suitable fibre optic gyro is the E-Core 2000 Series Fibre Optic Gyro manufactured and sold by KVH Industries, Inc., 50 Enterprise Center, Middleton Road, R.I. 02842. Other gyros that could also be used include a ring laser, mechanical gyro, tuning fork, spinning disk gyro, semiconductor gyro, etc. Integrating the output of the gyro will produce an angle delta indicating that the gyro was rotated by a certain angle. The fibre optic gyro discussed above measures angular rate about a single axis. However, multi-directional gyros can also be used. In one embodiment, the system can use three or more gyros instead of two in order to measure pitch, roll and yaw.

In one embodiment, each camera sensor unit 132 includes electronics in the camera head interface for receiving signals from the pan encoder, tilt encoder, two gyros, two inclinometers, 2× Extender, lens focus and lens zoom. This data is sent to a processor which packages the data, synchronizes the data and encodes the data on the audio channel by modulating an audio carrier in order to send the data in the camera's microphone (or audio) channel to the television production studio. More information about using camera sensors can be found in U.S. patent application Ser. No. 09/160,534 filed Sep. 24, 1998, U.S. Pat. No. 5,912,700, both of which are incorporated herein by reference.

Gatherer 110 also receives information from key data processor 116. In one embodiment, key data processor 116, telestration processor 108 and rendering processor 150 are O2 workstations from Silicon Graphics. Other computers can also be used. Key data processor 116 is used to provide information on which colors are included and excluded from being blended with the illustrations by the operator. More information on this will be discussed below. In sum, gatherer 110 packages the key data, the sensor data and the time code into a set of information and sends that set of information to telestration processor 108. Gatherer 110 can package other types of data as well. Telestration processor 108 determines how the graphics drawn on touch screen 104 should be blended with the program video and sends that information to rendering processor 150. Rendering processor 150 takes charge of the actual blending of the graphics with the program video.

To perform the blending, rendering processor 150 supplies two signals 170 and 172 to program keyer 152 and off-line keyer 154. Signal 170 is called alpha and signal 172 is called foreground. Program keyer also receives an input from video delay 158. Video delay 158 receives the program video and delays it for a number of frames and transmits the delayed video to program keyer 152 and rendering processor 150. The delayed program video sent to program keyer 152 is called background. Based on the level of the alpha 170 from rendering processor 150, program keyer 152 determines how much foreground and background to blend on a pixel by pixel basis. Program keyer 152 can blend from 100% foreground and 0% background to 0% foreground and 100% background. In one embodiment, the alpha for a particular pixel can range from 0% to 100% (or 0-1 or another similar range as per the specification of the keyer). The output of program keyer 152 can be sent for broadcast, recording or both. During typical operation described below, the output of program keyer 152 is live video.

Alpha 170 and foreground 172 are also sent to off-line keyer 154. The background signal received by off-line keyer 154 is from video delay 160. In one embodiment, the delayed video from video delay 160 is from a video storage device such as a tape player or other suitable storage device. In another embodiment, the video input to delay 160 is from a camera. In one alternative, the video input to delay 160 is also sent to telestration processor 108. The output of offline keyer can be used to produce replays, half time shows or highlights.

The system can also include a kill switch which can be used by an operator to enable or disable the keying of the graphic. Additionally, a watch dog timer can be included to automatically disable the keying of the graphic if rendering processor 150 stops sending a periodic signal.

As an additional option, the system could also include a data inserter for inserting non-video data into a television signal. Non-video data is information other than traditional data used by a television to draw the normal scan lines on a television display. An example of non-video data is data transmitted during the vertical blanking interval, which can be closed-caption data, statistics regarding the game, interactive queries or Internet addresses. The optional data inserter can receive the video signal from program keyer 152 and insert the non-video data into the vertical blanking interval of the television signal. The output of the data inserter would be broadcast, recorded or both. In one embodiment, a data inserter can insert into the video signal instructions for a computer to enhance the video. At the viewer's home will be a set-top box which can read the instructions from the received signal and pass the information to the computer. The computer can use the instructions to blend the graphic with the video. Thus, a viewer can customize and control the enhancements using the viewer's personal computer. Alternatively, the set-top box will be capable of applying the enhancement.

Figure 6:
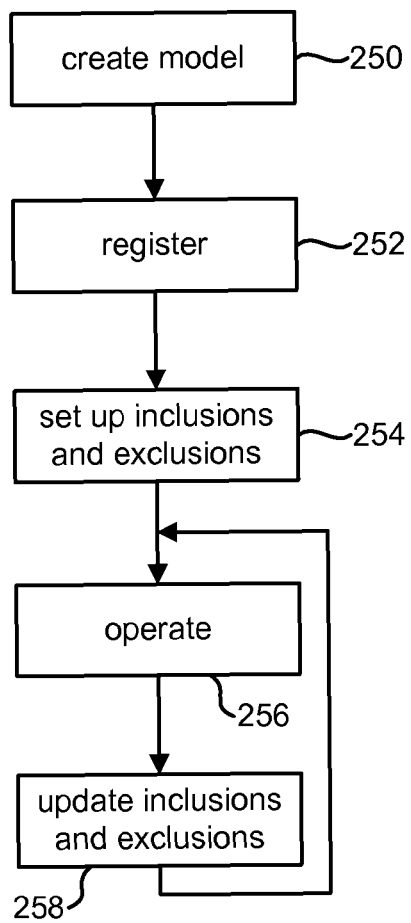
FIG. 6 is a flow chart describing a process that uses the current invention.

FIG. 6 is a flow chart describing operation using the present invention. One embodiment of the present invention includes making the graphics drawn using touch screen 104 look like they were drawn on the actual field or surface. This requires transforming coordinates between two dimensional coordinate systems and three dimensional coordinate systems. One means for accomplishing such transformation includes using a model of the surface being displayed on television. In step 250, the user of the system creates a mathematical model of the environment being displayed on the television. If the system is being used to add illustrations to a football field, then the environment would only include the football field and step 250 would include creating a model of the football field. If the user intends to add illustrations to other portions of the stadium, then the environment must include those other portions of the stadium as well. The model created is a three dimensional model of the environment. For example, if the environment to be modeled is a football field, the model would include a description of the surface of the football field. Most football fields are not flat surfaces, and include crown for drainage purposes. Additionally, many fields include other variations in the height (and possibly length and width) of the field due to errors and other abnormalities. Thus, the model will serve as a three dimensional representation of the surface of the field. If the environment includes portions of the stadium, then the model will include the relevant features of the stadium such as any retainer walls, the top of the stands and any other surface the user may want to add a graphic to.

One means for determining a model is to measure data for different points in the environment. In one embodiment, each data point includes x, y and z values. Any method can be used to obtain these x, y and z values. One example of a suitable method is to use a laser plane for z values and a laser range finder for x and y values, or other surveying devices. For simplicity, in a broadcast of an American football game, a coordinate system is set up with the origin at the near corner of the left end zone, the y-axis along the width of the field (e.g. the back of the end zone), the x-axis is along the length of the field (e.g. the side line) and the z-axis extends vertically from the field. The operator can measure or use the yard markings on the field to determine the x and y coordinates for most points of interest on the field. The laser plane can be used to measure the corresponding z coordinate. The laser plane is utilized by placing the laser plane at the origin (or another point) and reading the laser image off a pole that is positioned at the point of interest. In one embodiment, data samples are taken for the back of both ends zones, both goal lines, both 20 yard lines and both 40 yard lines. For each yard line measured, measurement should at least be taken at each side line and then one or more points between the sidelines, including the middle of the field. Additional data points around the yard lines can also be measured. If the environment includes parts of the stadium, the laser plane, measuring tape or another measuring device can be used (as well as geometry) to determine data for other points in the environment.

In one embodiment, the data points measured can be used to create the model. That is, data points can be plotted and connected (symbolically). In another embodiment, a set of curves are created using the measured data. That is, if data is taken for a number of points along a line, then that line can be modeled by fitting the data into a curve of the form $A+By+Cy^2=z$, or using a different suitable equation. Thus, any point on a line at a given yard position can be found using that equation because it is assumed that every point at the yard position has the same x value. As the y value changes, the z value will also change. Similar curves can also be used to represent other lines. If the system wants to find the z value for a point between two curves, the system can interpolate. The set of curves created constitutes the model. Some models may require information in addition to the curves (e.g. polygons and/or topology).

After creating the model in step 250, the system is registered in step 252. Registration, a technology known by those skilled in the art, is the process of defining how to interpret data from a sensor and/or to ascertain data variable for operation of the system. The sensors described above output data, for example, related to position and orientation. Since position and orientation are relative, the system needs a reference from which to determine position or orientation. Thus, in order to be able to use camera sensor data, the system needs to know how to interpret the data to make use of the information. Generally, registration includes pointing the instrumented cameras at known locations and solving for unknown variables used in transformation matrices. More detail of how to register the system can be found in any of the patent applications or patents incorporated by reference above or in U.S. Pat. No. 5,862,517 which is incorporated herein by reference.

In step 254, the operator will set up inclusions and exclusions. In one embodiment of the present invention, the graphic can be added to the video without taking into account the contents of the video signal. There will be no accounting for occlusions; for example, a player or object in front of the surface on which the enhancement is intended to appear. In another embodiment, the present invention can include inclusions and/or exclusions in order to account for occlusions and other object or markings. An inclusion is a color range for a pixel that can be enhanced using the present invention. An exclusion is a color range for a pixel that should not be enhanced using the present invention. During operation, the operator can set up one or more inclusions and/or one or more exclusions. For example, the operator may decide that a graphic can be drawn over green (grass) and brown (dirt). Additionally, the operator may want to set up the exclusion so that a line is not drawn over a specific color (e.g. team's uniforms). It is possible to allow drawing over one shade of green (grass) and not allow drawing over a second shade of green (team's shirt color). In an alternate embodiment of the present invention, exclusions can also include video frame pixel positions or real world locations that are not to be enhanced. The process of setting up inclusions and exclusions is performed using key data processor 116.

When operating the system of FIG. 5, step 254 of FIG. 6 includes sending an output from a camera to key data processor 116. The camera will be panned and tilted to point to the different areas of the field or stadium. The operator can view the output of the camera on a monitor and, using a pointing device (e.g. a mouse), select areas for inclusion (create an inclusion filter) or exclusion (create an exclusion filter). For example, the operator could choose the shady grass, sunny grass and dirt for inclusions. The operator may choose the players' uniforms, shoes, football and chalk as exclusions.

When setting up inclusions and exclusions, key data processor 116 first receives a set of pixels. In one embodiment of the present invention, the pixel set received is from the output of one of the cameras. For example, a pixel set can include selected pixels from an image of the playing field, selected pixels from an image of one of the teams' uniforms, or other images. In another embodiment, the pixel set can be received from a stored image.

Once the pixel set is received, the operator of key data processor 116 determines whether the pixel set is to be used for identifying exclusion pixels or identifying inclusion pixels. If it is determined that the pixel set has been received for establishing criteria for exclusion pixels, then key data processor 116 generates an exclusion filter. If it is determined that the pixel set has been received to establish criteria for inclusion pixels, then key data processor 116 generates an inclusion filter. Multiple inclusion filters and exclusion filters can be generated.

In one embodiment of the present invention, key data processor 116 generates inclusion filters and exclusion filters by generating a set of histograms characterizing the received sets of pixels. For example, an inclusion filter may include a Y histogram, a Cr histogram and a Cb histogram, all of which describe the inclusion filter in YCbCr format. The Y characteristic histogram has a horizontal axis representing luminance values and a vertical axis representing the number of pixels in the received pixel set that corresponds to each of the luminance values. The Cr characteristic histogram has a horizontal axis representing Cr values and a vertical axis representing the number of pixels in the received pixel set that corresponds to each of the Cr values. The Cb characteristic histogram has a horizontal axis representing Cb values and a vertical axis representing the number of pixels in the received pixel set that corresponds to each of the Cb values. Each histogram has a respective pass band that defines the Y, Cr, or Cb characteristics that a pixel must have to be an inclusion pixel. Accordingly, a pixel will be designated as an inclusion pixel when the filter is applied and the pixel has a Y characteristic value within the Y pass band, a Cr characteristic value within the Cr pass band, and a Cb characteristic value within the Cb pass band. Exclusion filters work in a similar manner.

Figure 7:
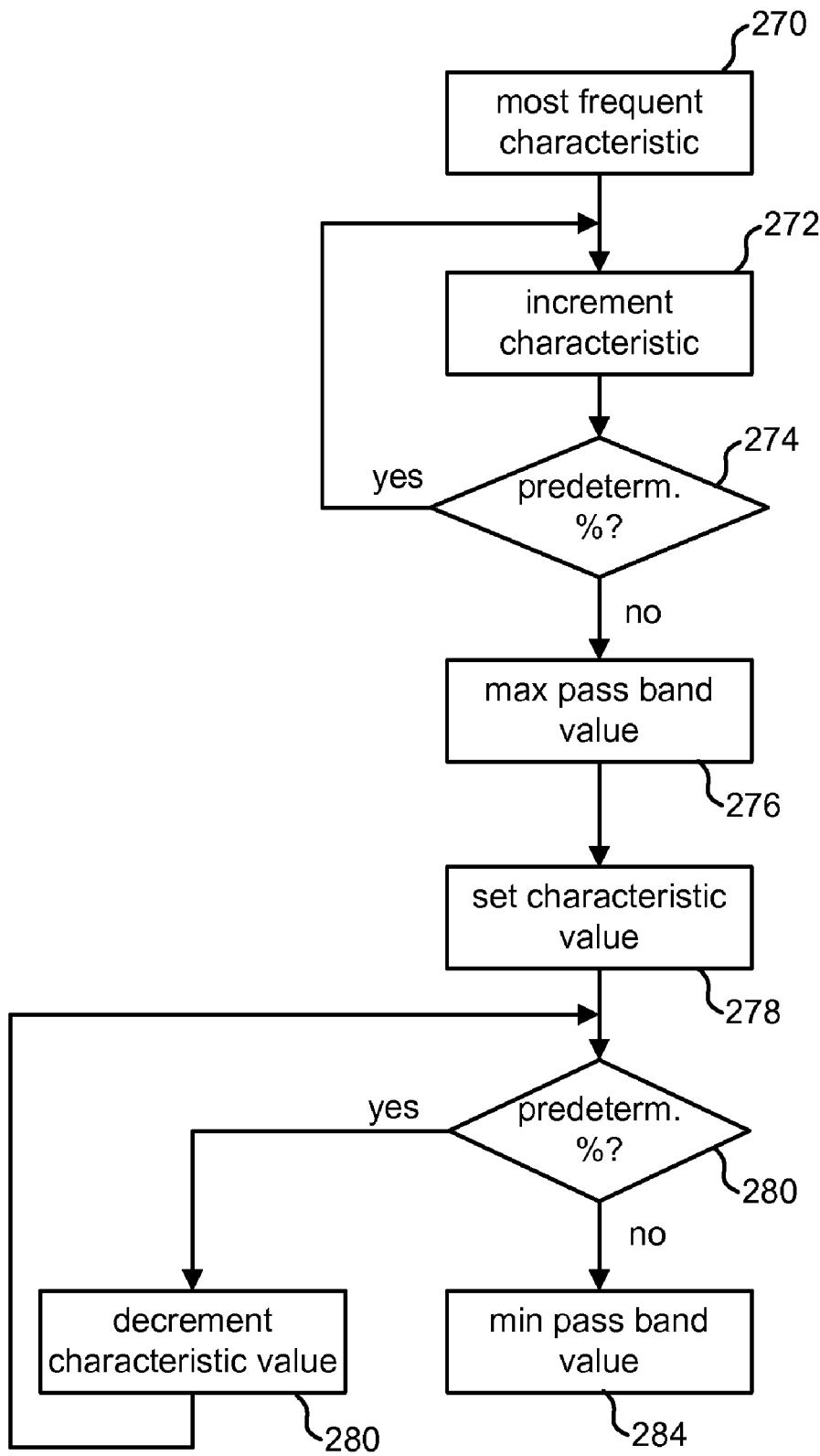
FIG. 7 is a flow chart describing the setting of a filter pass band.

FIG. 7 illustrates a sequence of operation performed by key data processor 116 to determine a pass band for an inclusion filter histogram or an exclusion filter histogram. In the embodiment using YCbCr, the steps of FIG. 7 are performed for each of the three histograms. First, key data processor 116 identifies the most frequently occurring value for the characteristic (Y, Cr, or Cb) represented by the histogram in step 270. Next, the characteristic value is incremented in step 272. It is then determined whether the number of pixels having the resulting characteristic value is within a predetermined percentage of the number of pixels having the most frequently occurring characteristic value in step 274. In one embodiment of the present invention, the predetermined percentage employed in step 274 is 10 percent for an inclusion filter and 50 percent for an exclusion filter.

If it is determined that the number of pixels with the characteristic value is above the predetermined percentage, then the characteristic value is incremented in step 272 and a new comparison is performed. If it is determined that the number of pixels with the characteristic value is not above the predetermined percentage, then the maximum characteristic value for the pass band is set in step 276 to be equal to the last characteristic value with a number of pixels above the predetermined percentage.

Once the maximum pass band characteristic value is set, the characteristic value is set to be equal to the characteristic value just below the most frequently occurring characteristic value in step 278. It is then determined whether the number of pixels having the resulting characteristic value is above a predetermined percentage of the number of pixels having the most frequently occurring characteristic value in step 280. In one embodiment of the present invention, the predetermined percentage employed in step 280 is one percent for an inclusion filter and twenty five percent for an exclusion filter. In another embodiment of the present invention, the predetermined percentage employed in step 280 is 10 percent for an inclusion filter and 50 percent for an exclusion filter.

If it is determined that the number of pixels with the characteristic value is above the predetermined percentage, then the characteristic value is decreased in step 280 and a new comparison is performed. If it is determined that the number of pixels with the characteristic value is not above the predetermined percentage, then the minimum characteristic value for the pass band is set in step 284 to equal the last characteristic value with a number of pixels above the predetermined percentage of the number of pixels representing the most frequently occurring characteristic value.

Although the generation of an inclusion filter and exclusion filter has been described with respect to forming a histogram, one of ordinary skill in the art will recognize that it is not necessary to actually form a graphical image of a histogram. A processor could also maintain a table of data that reflects the Y, Cr, and Cb data. It will also be recognized that percentage thresholds identified above are not the only percentages that may be employed. Any number of percentages may be employed, depending upon the resolution that is desirable for the filter. One with ordinary skill in the art will further recognize that other methods can be employed for generating inclusion filters and exclusion filters. For example, a color region or set of color regions can be selected for inclusion or exclusion using a chromacity diagram. More information on how to set up and use inclusions and exclusions is provided in U.S. patent application Ser. No. 09/160,534, filed Sep. 24, 1998, incorporated herein by reference.

After the inclusion/exclusion filters are created, a color map is created. The color map is a database with a record for each possible color based on Y, Cr and Cb values. In an alternative embodiment, less than all of the possible colors are represented in the color map. For each color in the color map, the database stores an alpha percentage. The stored alpha percentage could be a number between zero and one hundred, zero and one, or another suitable range. Although the term percentage is used, the stored number need not be a number designating a fraction of one or a fraction of one hundred. The stored number need only designate an amount of blending. In one embodiment the stored alpha percentage is a number between 0 and 255. When the operator selects a pixel set for an inclusion or an exclusion, the operator is asked to provide a percentage between zero and one hundred percent. The number provided by the operator is converted to a scale of 0-255. The converted number is stored as the alpha percentage for each color described by the inclusion/exclusion filter (e.g. each color within the pass bands of the filter).

Additionally, a taper zone is set up. The taper zone includes colors outside of but near the pass bands for a filter. One method for determining the colors in the taper zone is to create an additional set of pass bands (in addition to the inclusion pass bands) in the same manner as described above, but use different percentages so that the pass bands are wider. Those colors in the new pass bands but not in the inclusion pass bands are in the taper zone. The colors in the taper zone closest to the inclusion pass bands are given an alpha percentage equal to or slightly lower than the alpha percentage given to the colors in the inclusion/exclusion pass bands. The colors in the taper zone farthest from the inclusion pass bands are given an alpha percentage equal to no blending. The colors in between are given an alpha percentage based on linear interpolation. An analogous method is used for taper zones near exclusions. The alpha percentages for each color in the taper zones are stored in the color map.

After step 254 of FIG. 6, the present invention is operated in step 256 according to the methods described in FIGS. 8-12. FIG. 6 also shows step 258 which includes updating the exclusions and inclusions using key data processor 116. During an event, lighting conditions, field conditions and weather conditions may change causing the colors to be included and excluded to change. In that case, the inclusions and exclusions could be updated in step 258. Note that FIG. 6 shows step 258 being performed after step 256. However, steps 256 and 258 are actually performed concurrently or otherwise overlapped in time. In one embodiment or appropriate situations where there are no changes in conditions, step 258 would be optional.

Figure 8:
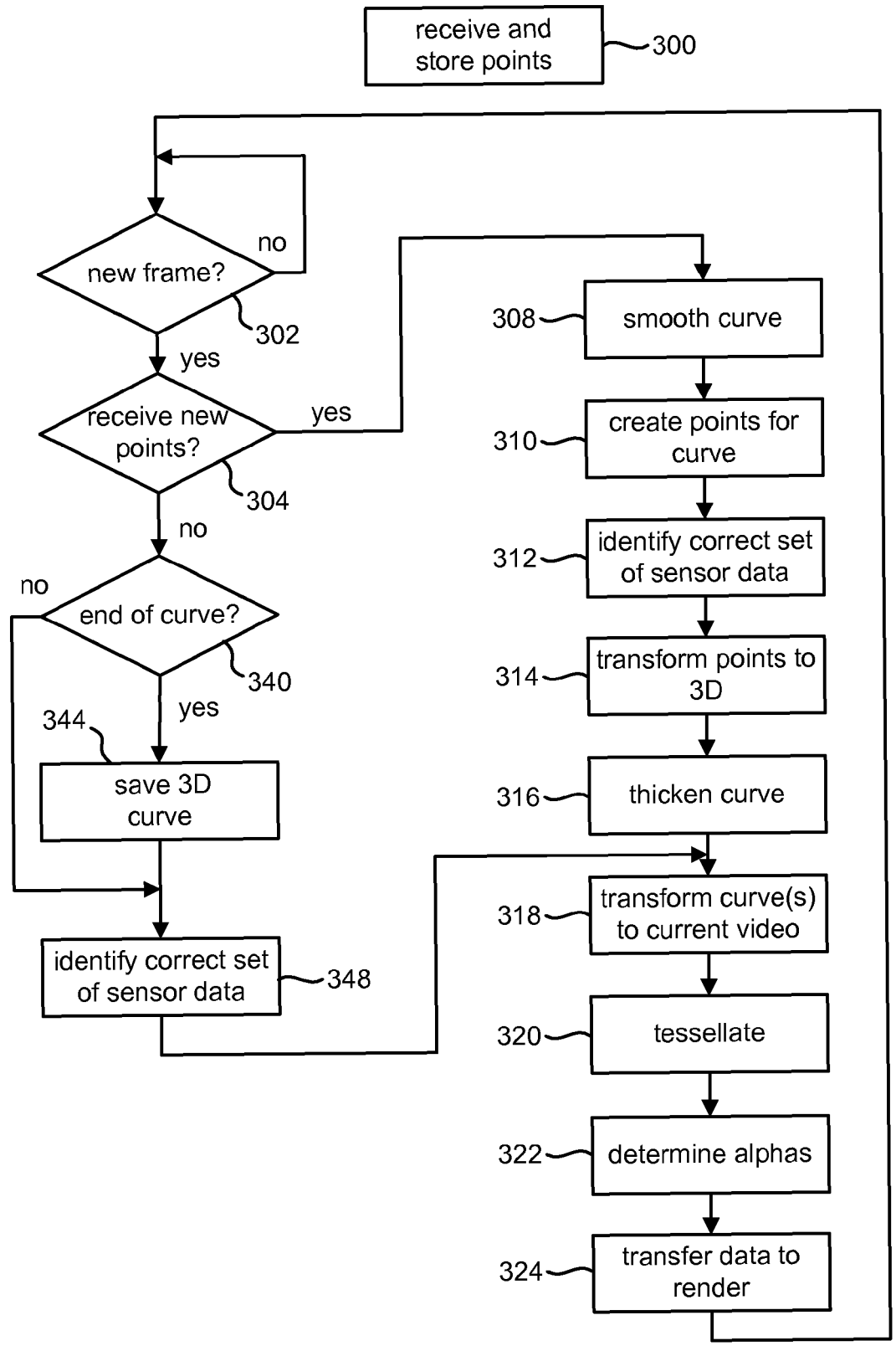
FIG. 8 is a flow chart describing a portion of the operation of the present invention.

FIG. 8 describes the operations performed by telestration processor 108. Step 300 includes receiving and storing pixel coordinates from touch screen 104. That is, as the user touches touch screen 104 with the user's finger (or a light pen or other suitable device), touch screen 104 outputs the coordinates of the pixel touched and sends the coordinates to telestration processor 108. As the user continues to move the user's finger, more points are sent to telestration processor 108. As telestration processor 108 receives those points, they are stored in memory, a hard disk or another storage medium. Step 300 is not depicted as being connected to any other steps because it is a process that is constantly being performed during the operation of the system.

Based on the received program video, telestration processor 108 waits for a new frame to start in step 302. When a frame starts, in step 304, telestration processor 108 determines whether it has received any new points from touch screen 104 since the last frame. If it has received new points, then in step 308, telestration processor 108 smoothes the curve represented by the points received from touch screen 104. That is, the operator using a light pen, mouse, finger or other pointing device to draw may draw a line or curve that is filled with jagged edges otherwise not very pleasing to the eye. Step 308 includes smoothing that curve or line to a more pleasing shape. In step 310, telestration processor 108 creates a set of points to represent the smoothed curve. More details of how a curve is smoothed is shown in the flow chart of FIG. 9. The steps of FIG. 9 include setting a number of control points. Step 310 includes dividing up the curve between each control point into eight (or more) segments. The end points of each segment are the points created in step 310. In step 312, telestration processor 108 identifies the correct set of sensor data. Remember that gatherer 110 receives data from all of the camera sensors and package it into one set of data, to be sent to telestration processor 108. Also remember that each VITC inserter (e.g. VITC inserter 136) adds a unique identifier to the vertical blanking interval of each camera. Thus, telestration processor 108 looks at the vertical blanking interval of the program video it is receiving and identifies the camera by the unique camera identifier. Gatherer 110 added a camera identifier to the sensor data for each of the individual cameras. Telestration processor 108 will match the camera identifier and time code from the program video to the camera identifier and time code of the appropriate camera sensor data. Thus, telestration processor 108 will use the camera sensor data from the camera providing the program video.

In one embodiment, the sensor data used to transform the graphics may be recently recorded or may be previously recorded (e.g. fifteen minutes previously, hours previously, etc.). For example, video captured earlier is stored with its camera identifier and times codes. The stored camera identifier and times codes can be used to identify the appropriate stored camera sensor data. In this way, the invention can operate on stored video and stored sensor data after the event has taken place.

In step 314, each of the points identified in step 310 are transformed from the two dimensional coordinate system of the touch screen to the three dimensional coordinate system of the football field (or other surface of the live event). Various means for converting points between coordinate systems are known in the art. One example of doing such a transformation is to use transformation matrices. The use of transformation matrices to convert between coordinate systems is well documented in the art. One of ordinary skill in the art would know to insert the data from the camera sensors identified in step 312 into a set of transformation matrices and use those matrices. Examples of the use of transformation matrices can be found in U.S. Pat. No. 5,862,517, U.S. Pat. No. 5,912,700 and U.S. patent application Ser. No. 09/160,534, filed Sep. 24, 1998, all of which are incorporated herein by reference. Step 314 includes transforming all of the points created in step 310. After step 314, telestration processor 108 has a set of points in the three dimensional coordinate system of the football field (or surface) representing the curve drawn by the operator. In step 316, the curve is thickened. That is, telestration processor 108 creates a set of quadrilaterals in three dimensional space. The centers of each of the adjacent sides of the quadrilaterals are the points that were transformed in step 314. Step 316 includes storing the vertices for each of these quadrilaterals. This set of vertices defines the thickened line in three dimensional space. In step 318, telestration processor 108 transforms all the curves to the current video frame (or field). That is, all of the vertices of the current curve just operated on in steps 308-316 are transformed to the two dimensional coordinate system for the current camera tallied for broadcast. Additionally, there may be other curves or graphics that may be drawn on the screen previously that have been stored in three dimensional space. These curves are also transformed in step 318. The curves are transformed by transforming each of the vertices of the various quadrilaterals representing the curves. The quadrilateral vertices are transformed using transformation matrices.

After transforming all of the curves to the current video frame, the system tessellates the curves in step 320. Tessellation involves breaking up the quadrilaterals if the cameras have zoomed in past a certain threshold. One example of a threshold is testing whether the sides of the quadrilaterals are more than 15 pixels. For a particular quadrilateral, if the threshold has been met then the quadrilateral is subdivided into small quadrilaterals. In one embodiment, the system will divide the length and width (in pixels) of the quadrilaterals by 15, with the result being the number of sections the length or width must be broken up. In one alternative, the number of sections is rounded to the nearest power of two for convenience.

In step 322, telestration processor 108 determines alphas for a subset of the pixels for the current video frame or field to be blended. These alphas will be used to derive the alpha signal 170 sent by rendering processor 150 to program keyer 152 and/or offline keyer 154. In one embodiment, step 322 determines alpha values for each vertex of each quadrilateral after tessellation (step 320). After step 322, telestration processor 108 adds the graphics to the program video and sends the enhanced program video to display 102. This output sent to display 102 may not suitable for broadcast. The final broadcast video is provided by program keyer 152. After determining the alphas in step 322, telestration processor 108 sends the information to rendering processor 150 in step 324 and the system loops back to step 302.

If in step 304 telestration processor 108 determines that it has not received any new points, then an inquiry is made (step 340) as to whether the user has finished drawing the curve. In one embodiment, when the user lifts the user's finger or light pen from touch screen 104, a pen-up event is generated which signals that the user has finished drawing the curve or graphic. When there is a pen-up event, the method loops to step 344 and the system will save the curve in three dimensional coordinates. That is, the points that were the result of step 316 are saved. If there was no pen-up event, the method loops to step 348. If telestration processor 108 is performing step 348, it is assumed that no new curve data has been received and the system needs to redraw the existing curves onto the new frame (or field of video). In step 348, telestration processor 108 identifies the correct sensor data (similar to step 312). After accessing the correct data in step 348, telestration processor 108 loops to step 318 and continues the process from step 318 to draw the existing curves for the current field or frame of video. It is contemplated that the interface for the present invention could include an erase button which causes all curves currently being displayed to be erased and the system to be reset in that respect.

Figure 9:
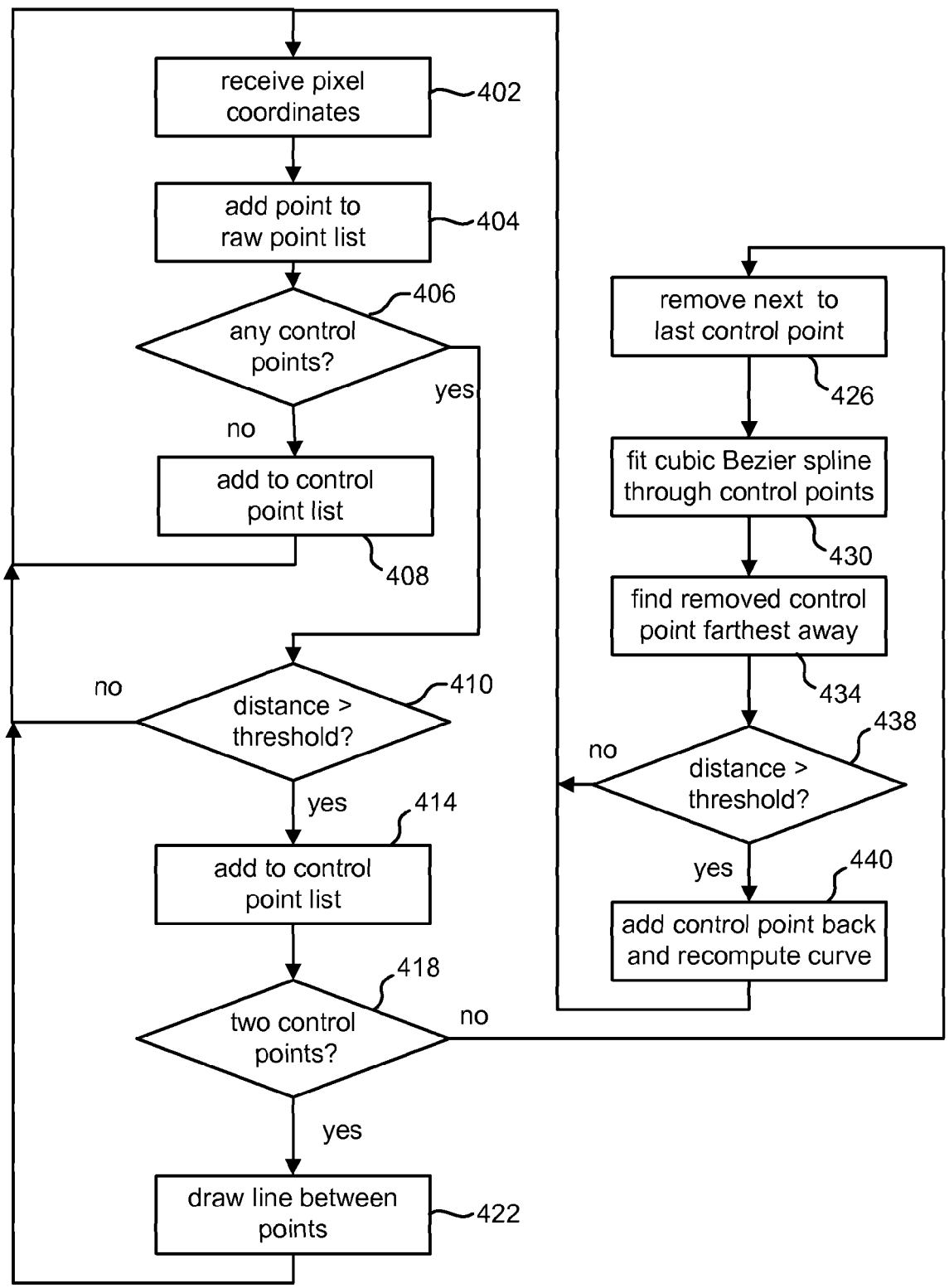
FIG. 9 is a flow chart describing the process of smoothing a curve.

FIG. 9 is a flow chart describing more detail of step 308 of FIG. 8, smoothing the curve of points received from touch screen 104. In step 402, the process receives the pixel coordinates. These pixel coordinates have an X coordinate and a Y coordinate pertaining to the position on touch screen 104. In step 404, the coordinates are added to a raw point list. The system also maintains a control point list. In step 406, the system determines whether there are any points on the control point list. If there are no points on the control point list, then the raw points just received in step 402 are added to the control point list in step 404 and the method loops back to step 402.

If in step 406, it is determined that the control point list does include one or more control points, then the method loops to step 410 and telestration processor 108 determines whether the most recent point added to the raw point list in step 404 is a distance greater than a threshold from the last control point added to the control point list. An example of a suitable threshold is ten pixels. If the distance between the most recent raw point and the last current point is not greater than the threshold, then the method loops back to step 402. If the distance between the most recent raw point and the last control point is greater than the threshold, then the method loops to step 414 and the most recent raw point is added to the control point list. If the number of control points in the control point list is exactly two points, then the method loops to step 422 and a line is drawn between these two points. After step 422, the method loops back to step 402. If in step 418, there are more than two control points in the control point list, the method loops to step 426, at which point the next to last control point is removed from the control point list. In step 430, telestration processor 108 will fit a cubic Bezier spline through the control points. In step 434, telestration processor 108 will find the removed control point that is farthest away from the curve. A removed control point is a point that was once on the control point list, but was subsequently removed from the control point list. In step 438, telestration processor 108 will determine whether distance from the curve to the removed control point found in step 434 is greater than a threshold (e.g. ten pixels). If the distance is not greater then the threshold, the method loops back to step 402. If the distance is less than or equal to the threshold, then in step 440 that removed control point is added back to the control point list and the cubic Bezier spline is re-computed.

Figure 10:
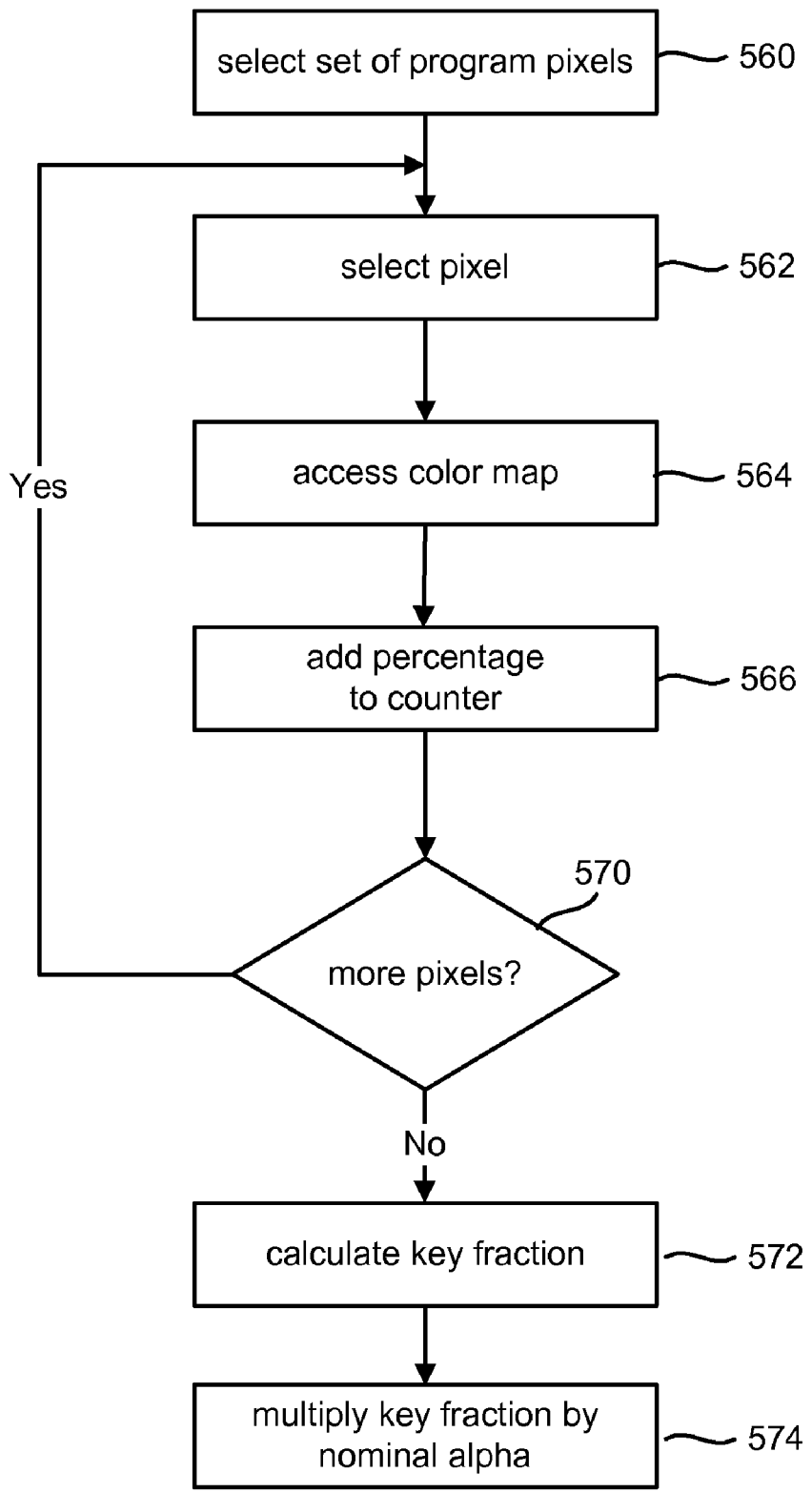
FIG. 10 is a flow chart that explains one embodiment of the process of determining alpha values for pixels in a video.

FIG. 10 illustrates a sequence of operations performed in one embodiment of the present invention for determining an alpha value for one of the vertices of a quadrilateral. First, a set of pixels in the program video is selected in step 560. In one embodiment, the set of pixels in the program video include the pixel in the program video having the same coordinates as the vertex under consideration. Additionally, the set contains at least four pixels surrounding the pixel in the program video having the same coordinates as the vertex under consideration. In other embodiments, more or fewer than four additional pixels can be used. In one alternative, the four pixels are adjacent to the pixel in the program video having the same coordinates as the vertex under consideration. In other embodiments, the four pixels are a predefined distance away from the pixel in the program video having the same coordinates as the vertex under consideration. The predefined distance can be selected from experimentation based on the desired effect. In step 562, one of the pixels in the set is selected. In step 564, the color of the pixel is used to access the color map. That is the Y, Cr and Cb values or characteristics for the pixel are used to access the appropriate alpha percentage in the color map described above. In step 566, the alpha percentage accessed in the color map is added to a counter.

In step 570, a determination is made as to whether there are more pixels to be considered from the set of pixels. If there are more pixels to be considered, then a new pixel from the set is selected in step 562. Otherwise, a key fraction is calculated in step 572. In one embodiment of the present invention, the key fraction is calculated by dividing the counter value by the total number of pixels in the selected set of program pixels. At step 572, the counter value should equal the sum of the alpha percentages for each pixel in the set. The key fraction, therefore, represents the average alpha percentage for the set. It is contemplated that other means can be employed to determine the key fraction.

Once the key fraction is calculated, the alpha value for the vertex is determined in step 574 by multiplying the key fraction by a nominal alpha. The nominal alpha is set in advance by the user to set the overall transparency or look of the graphic. In one embodiment, a slider on a graphical user interface allows a user to see how changing the nominal alpha changes the keying. The above described process is repeated for each of the vertices. An alternative method for determining alphas and drawing graphic is described in U.S. patent application "System For Enhancing a Video Presentation of a Live Event," Gloudemans, et al., Ser. No. 09/160,534, filed Sep. 24, 1998, incorporated herein by reference.

Figure 11:
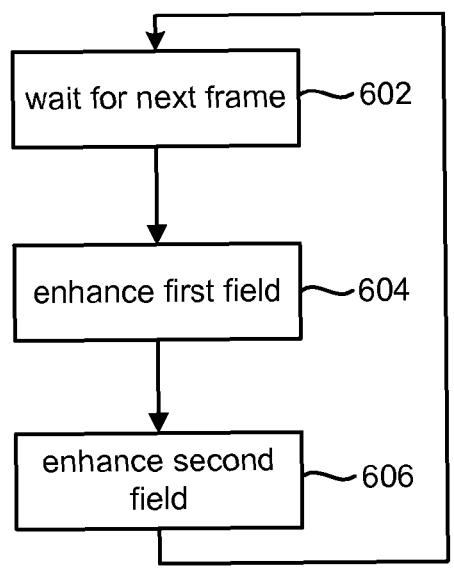
FIG. 11 is a flow chart describing a portion of the operation of the present invention.

FIG. 11 is a flow chart which describes the operation of rendering processor 150. In step 602, rendering processor 150 waits for the next frame to start. Rendering processor 150 receives the program video from video delay 158. By looking at the program video, rendering processor 150 determines when the next frame is starting. Rendering processor 150 receives data from telestration processor 108. This data includes the pixel coordinates of the polygons to be drawn, tessellations per quadrilateral (number of subdivides), alphas for the vertices of the quadrilaterals, the colors of the polygon, texture, fill characteristics for the polygons and time code for the frame or field associated with the data. When rendering processor 150 identifies that the next frame is, it performs the step of enhancing the first field (step 604). After enhancing the first field, rendering processor then enhances the second field in step 606. After enhancing the second field, rendering processor waits for the next frame in step 602.

Figure 12:
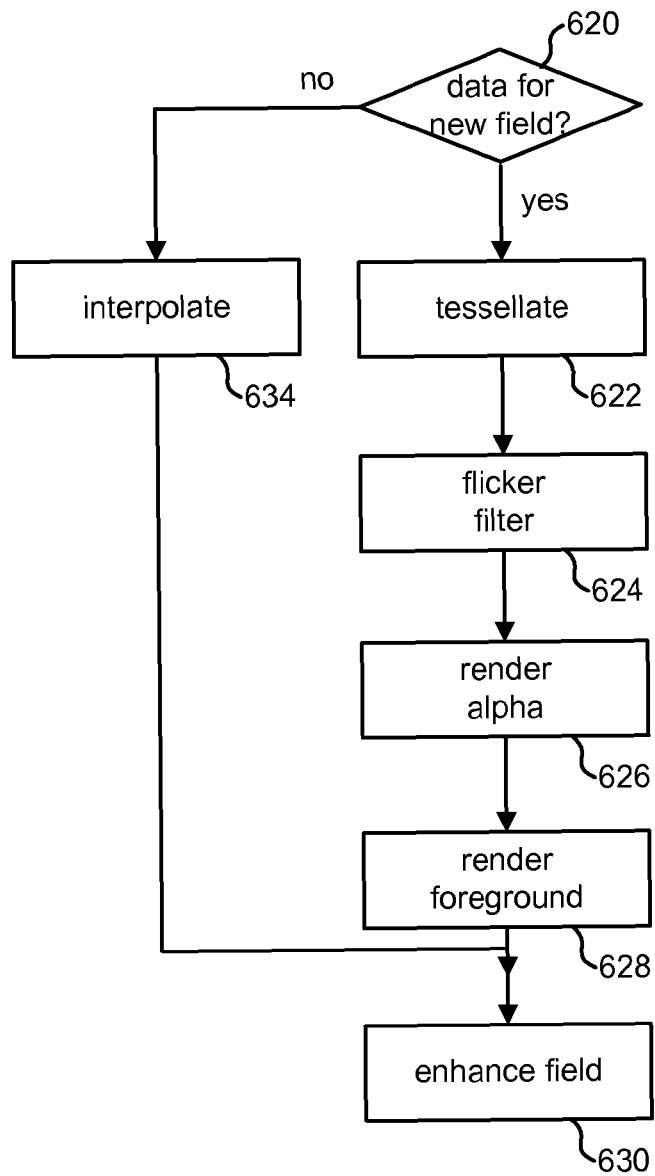
FIG. 12 is a flow chart describing the steps for enhancing a field of video.

FIG. 12 describes the process for enhancing a field of video. In step 620, rendering processor 150 determines whether it has data for the field that is to be enhanced. That is, by looking at the time code associated with the field from the delayed program video, rendering processor 150 looks for the data from telestration processor 108 having a similar time code. If that data is found, then it has data for the new field. Otherwise, there is no data for the particular field under consideration. If there is data for the field under consideration, then in step 622 rendering processor 150 will tessellate the quadrilaterals. Telestration processor 108 performed tessellate step 320 previously in FIG. 8. When telestration processor 108 sent the data to rendering processor 150, telestration processor 108 sent the alphas for all the vertices; however, it did not send the coordinates for the new vertices created during tessellate step 320. Thus, in step 622, rendering processor 150 will tessellate the quadrilaterals and determine the appropriate coordinates of the new vertices. In step 624, a flicker filter will be applied to the data.

The flicker filter of step 624 is employed to reduce flickering in the appearance of the graphic. The flicker filter averages a newly calculated alpha for the pixel with past and future alphas for the same pixel to generate a filtered alpha. In one embodiment of the present invention, the flicker filter operation is performed according to the following equation:

$$\alpha_F = \frac{(\Sigma \alpha_{FP} + \alpha + \Sigma \alpha_U)}{N}$$

wherein
$\alpha_F$ is the filtered alpha;
$\Sigma \alpha_{FP}$ is a summation of filtered alphas for the selected pixel in prior video frames;
$\alpha$ is the unfiltered alpha of the selected pixel for the current video frame;
$\Sigma \alpha_U$ is a summation of unfiltered alphas for the selected pixel for future video frames; and
N is a number of values being averaged.

It is possible to obtain filtered alphas for pixels using future alpha values, because delays in the system provide for the calculation of alphas several frames in advance of their use. In one embodiment, $\Sigma \alpha_{FP}$ is the sum of the selected pixel's filtered alphas for the two video frames preceding the current video frame; $\Sigma \alpha_U$ is the sum of the selected pixel's filtered alphas for the two video frames following the present video frames; and N is equal to 5. In an alternate embodiment, the summation of filtered alphas for the selected pixel in prior video frames ($\Sigma \alpha_{FP}$) is replaced by a summation of unfiltered alphas for the selected pixel in prior video frames. In one embodiment of the present invention, the flicker filter operation is applied to the alphas of the center points, border points and edge points. In alternate embodiments, the flicker filter is applied to only a subset of the alphas of the center points, border points, and edge points. In yet another embodiment, the flicker filter is applied to each pixel to be blended. In further embodiments, the flicker filter operation is not employed. In still further embodiments, values of alphas from different times can be weighted differently.

Looking back at FIG. 12, in step 626, rendering processor 150 determines the alpha signal to be sent to the keyers. This step includes taking all the alpha values and creating a signal in the appropriate video format accepted by the keyer. In step 628, rendering processor 150 renders the foreground. This step includes creating a signal in the appropriate video format accepted by the keyer. In one embodiment, steps 626 and 628 occur at the same or overlapping times. One embodiment for rendering the foreground and alpha signals includes dividing the graphic into regions with each region being defined by a set of vertices. In one embodiment, the vertices of steps 626 and 628 are the vertices of the quadrilaterals determined from the tessellate step. If there was no tessellation, then the vertices are the vertices of steps 626 and 628 are the vertices of the quadrilaterals without tessellation.

For each region, the fill characteristics and alpha of each of vertex of the region is employed to establish the fill characteristic and alpha for each pixel within the region. For example, a region can be rendered with all pixels having the same fill characteristics and varying alphas. In such an embodiment, the fill characteristics for the vertices defining the region are the same. These fill characteristics are then applied to each of the pixels within region. The alpha for each of the pixels in region is determined by using interpolation based on the alphas for each vertex defining region.

In one embodiment of the present invention, a computer generates (e.g. rendering processor 150) and supplies the graphic, by executing instructions from a program stored in memory. In one embodiment, the computer uses the Open GL language and generates a set of polygons using a glBegin, glEnd command in conjunction with a GL_QUADS instruction. The GL_QUADS instruction provides sets of vertices to the glBegin, glEnd command for drawing quadrilaterals. Also provided are the alphas and fill characteristics for each vertex. A quadrilateral is generated by the glBegin, glEnd command for each set of four vertices that is provided.

In an alternate embodiment to the present invention, graphics can be provided with regions that have more or fewer than four vertices and/or different fill characteristics for each of the vertex pixels. When a different number than four vertices are employed, the segments that are rendered will be a shape other than a quadrilateral. When different fill characteristics are provided for each vertex pixel, in one embodiment of the present invention, bilinear interpolation is employed to determine the fill characteristics for each of the pixels in the region based on the fill characteristics for the region's vertex pixels.

Look back at FIG. 12, in step 630, rendering processor 150 causes the current field to be enhanced. In one embodiment, the enhancement is performed by blending the foreground with the background. Example of enhancement include using a keyer, a video processor or other equipment to combine video images or edit program video.

In further embodiments of the present invention, each pixel in the graphic can be analyzed individually to determine its alpha. In one such embodiment, the above described process for determining the alpha for vertex can be employed for each of the pixels in the graphic.

An alpha value or signal is one example of a blending coefficient. A blending coefficient is a value used to indicate how to blend one image or video with a second image or video. The above discussion describes a means for determining alphas for various pixels and using the determined alphas for blending a graphic using a keyer or a computer. It is contemplated that other technologies can be used to blend the graphic and that these other technologies may use different blending coefficients than an alpha signal.

In one embodiment, the lines, shapes or graphics drawn using the telestrator system of the present invention can have varying width, color, texture or levels of transparence. Touch screen 104 and display 102 can include a graphical user interface which allows the user to select color, line width, texture or transparency. Additionally, texture can be a function of zoom. That is, the more a camera is zoomed in, the more a grass-like texture is added to the illustrations. In alternative embodiments, the user interface for determining texture, color, line width and transparency is provided in a television production studio, on telestration processor 108 or on rendering processor 150.

Another feature of the present invention includes one touch highlighting. This allows the operator of touch screen 104 to touch an image on display 102 and have that image highlighted. The highlight will include a type of graphic to identify the object of interest. In one embodiment, the highlight is partially transparent so that the object being highlighted is not occluded. In another embodiment, the keying process described above can be used to make the highlight look like it is beneath the object being highlighted. Examples of highlights could include a cloud, a hollow circle, icons, team logos, bright spots, etc. The user interface could allow the operator to choose the appropriate highlight. In operation, the one touch highlight can be performed by the operator touching the screen once quickly. Upon sensing the quick touch, the system will add the pre-chosen highlight to the video at the touched position. In one embodiment, the highlight will just be a two dimensional highlight and remain on the current video screen only. In another embodiment, the highlight's position will be transformed to three dimensional coordinates and appear to be painted onto the field. One touch highlighting is performed according to the steps described above with minor changes. For example, there is no need to smooth or thicken a curve. Rather, if the system determines that only one (or a different small threshold) point was received, then the system assumes it is adding a one touch highlight rather than a line or other shape. A single set of coordinates representing the position of the one touch highlight is transformed in step 314 of FIG. 8. Step 316 of FIG. 8 is changed to convert the one three dimensional location into four vertices that bound the highlight. Alternatively, the system can test for a request to highlight by testing for a small amount of time that the finger touched the screen and/or a maximum length of a curve.

In one embodiment, the present invention telestration system can be used in conjunction with a system for drawing a line on a field of play during an event such as described in U.S. patent application Ser. No. 09/160,534, filed on Sep. 24, 1998. In that combination, delay 158 of FIG. 5 could be eliminated or changed. For example, the input to program keyer 152 would be the output from the system drawing the line on the video of the field. That system drawing a line would have its own delay. Thus, there may not be a need for additional delay or the delay from delay 158 can be reduced to a smaller number of frames to account for the delay added by the line drawing system. Additionally, in such a combination of systems, many of the components that are common to both systems can be shared.

In one embodiment, the system can perform line smoothing without performing the key process or the transformation between coordinate systems. In another embodiment, the system can perform the transformation without the keying and the line smoothing. In yet another embodiment, the system can perform the keying without performing the transformations and the smoothing. In the embodiments that do not include transformations, the coordinates remain in two dimensional space for a particular camera and the graphics drawn on the video do not appear to be painted on the field.

The embodiments discussed above contemplate the use of camera sensors to determine the attitude of the camera. An alternative to camera sensors includes using pattern recognition or other types of image recognition. By looking for known locations or known images in a video, telestration processor 108 can determine the attitude of the camera. One example is to use infra red beacons or special lights throughout the event. Telestration processor 108 can look for these beacons or lights in the video. Another alternative is to preselect landmarks in the scene prior to the event. The coordinates of these landmarks can be preset. By searching for these landmarks in the video, telestration processor 108 can determine the attitude of the camera. In another embodiment, camera sensors can be replaced by pattern recognition allowing the system to recognize landmarks near a user's drawings on the video. Then by finding these landmarks in future frames or fields, telestration processor 108 can determine the position in the subsequent frames to place the drawing. Another embodiment of the present invention can utilize a combination of camera sensors and pattern recognition to place the graphics on the video. One example of such an embodiment uses camera sensors to get a rough estimate of where the graphic should be placed and uses pattern recognition to refine that estimate.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. The invention is, thus, intended to be used with many different types of live events including various sporting events and non-sporting events. It is intended that the scope of the invention be defined by the claims appended hereto.

We claim:

1. A method of annotating video, comprising:
   receiving video, said video depicts a first portion of a surface at a live event and a set of one or more objects occluding a second portion of said surface;
   receiving a graphic manually created by a human operator during said live event; and
   blending said graphic with said video, said blending includes determining not to draw said graphic over said set of one or more objects, said receiving video, receiving a graphic and blending are performed during said live event.

2. A method according to claim 1, wherein said blending said graphic includes:
   determining to draw said graphic over said first portion of said surface in said video; and
   drawing said graphic over said first portion of said surface without drawing said graphic over said set of one or more objects such that said graphic appears to be drawn on said surface.

3. A method according to claim 1, wherein said video is from a first camera and said graphic is created in relation to a two-dimensional image from a second camera depicting said surface at said live event, said method farther comprising:
   receiving two-dimensional position information for said graphic in relation to said two-dimensional image from said second camera;
   converting a first set of one or more two-dimensional positions corresponding to said two-dimensional position information to one or more three-dimensional positions; and
   converting said one or more three-dimensional positions to a second set of one or more two-dimensional positions;
   wherein blending said graphic includes adding said graphic to said video from said first camera using said second set of one or more two-dimensional positions.

4. A method according to claim 1, wherein blending said graphic includes:
   adding said graphic at a first position in a first image of said video, said first position corresponding to a location of said first portion of said surface in said first image; and
   adding said graphic at a second position in a second image of said video, said second position corresponding to a location of said first portion of said surface in said second image, said first position is different from said second position.

5. A method according to claim 4, wherein receiving said video includes:
   receiving said first image of said video from a first camera; and
   receiving said second image of said video from a second camera.

6. One or more processor readable storage devices having processor readable code embodied on said one or more processor readable storage devices, said processor readable code for programming one or more processors to perform a method of annotating video, the method comprising:
   receiving video, said video depicts a first portion of a surface at a live event and one or more objects occluding a second portion of said surface;
   receiving a graphic manually created by a human operator during said live event, said graphic includes a first portion having position information corresponding to said first portion of said surface in said video and a second portion having position information corresponding to said second portion of said surface in said video; and
   blending said graphic with said video, said blending includes determining to enhance said video with said first portion of said graphic and determining not to enhance said video with said second portion of said graphic, said receiving video, receiving a graphic and blending are performed during said live event.

7. One or more processor readable storage devices according to claim 6, wherein said video is from a first camera and said graphic is created in relation to a two-dimensional image from a second camera depicting said surface at said live event, said method further comprising:
   receiving two-dimensional position information for said graphic in relation to said two-dimensional image from said second camera;
   converting a first set of one or more two-dimensional positions corresponding to said two-dimensional position information to one or more three-dimensional positions; and
   converting said one or more three-dimensional positions to a second set of one or more two-dimensional positions, said second set including said position information of said first portion of said graphic and said position information of said second portion of said graphic;
   wherein blending said graphic includes adding said first portion of said graphic to said video from said first camera using said second set of one or more two-dimensional positions.

8. A method of annotating video, comprising:
   receiving from a first camera first video depicting at least a portion of a surface at a live event;
   receiving two-dimensional position information for a graphic created in relation to a two-dimensional image of said portion of said surface from said first video;
   converting a first set of one or more two-dimensional positions corresponding to said two-dimensional position information to one or more three-dimensional positions;
   receiving from a second camera second video depicting at least said portion of said surface at said live event; dimensional
   converting said one or more three-dimensional positions to a second set of one or more two-dimensional positions; and
   blending said graphic with said second video using said second set of one or more two-dimensional positions.

9. The method of claim 8, wherein:
blending said graphic includes using said second set of one more two-dimensional positions such that said graphic appears to be drawn on said portion of said surface in said second video at a position corresponding to said two-dimensional position information for said graphic created in relation to said two-dimensional image from said first video.

10. A method according to claim 8, farther comprising:
receiving said graphic during said live event, said graphic is manually created by a human operator during said live event.

* * * * *

UNITED STATES PATENT AND TRADEMARK OFFICE
CERTIFICATE OF CORRECTION

PATENT NO.         : 7,750,901 B2                                   Page 1 of 1
APPLICATION NO.    : 12/359092
DATED              : July 6, 2010
INVENTOR(S)        : Meier et al.

It is certified that error appears in the above-identified patent and that said Letters Patent is hereby corrected as shown below:

Col. 20, line 62: After "event;" and before "converting" delete "dimensional."

Signed and Sealed this
Twenty-eighth Day of December, 2010

David J. Kappos
*Director of the United States Patent and Trademark Office*